(12) United States Patent
Miroewski

(10) Patent No.: US 7,988,168 B2
(45) Date of Patent: Aug. 2, 2011

(54) TOY VEHICLE

(75) Inventor: Michael Miroewski, Aurora, OH (US)

(73) Assignee: The Step2 Company, LLC, Streetsboro, OH (US)

( * ) Notice: Subject to any disclaimer, the term of this patent is extended or adjusted under 35 U.S.C. 154(b) by 308 days.

(21) Appl. No.: 12/418,183

(22) Filed: Apr. 3, 2009

(65) Prior Publication Data

US 2010/0253035 A1 Oct. 7, 2010

(51) Int. Cl.
*A61H 3/04* (2006.01)

(52) U.S. Cl. .......................................... 280/200; 446/431

(58) Field of Classification Search .................. 280/200, 280/287, 278, 282; 446/431, 440, 451
See application file for complete search history.

(56) References Cited

U.S. PATENT DOCUMENTS

| | | | |
|---|---|---|---|
| 1,855,172 A | 4/1932 | Hess | |
| 2,458,127 A | 1/1949 | Ahrens | |
| 2,995,378 A | 8/1961 | Whetstone | |
| 3,229,988 A | 1/1966 | Mansperger | |
| 3,368,823 A | 2/1968 | Templeton | |
| 3,658,354 A | 4/1972 | Read | |
| 3,836,177 A | 9/1974 | Heidt | |
| 5,556,116 A * | 9/1996 | Sloss et al. | 280/7.15 |
| 6,164,666 A | 12/2000 | Prea | |
| 2007/0052199 A1 * | 3/2007 | Schulte et al. | 280/259 |

* cited by examiner

*Primary Examiner* — J. Allen Shriver
*Assistant Examiner* — James Dolak
(74) *Attorney, Agent, or Firm* — Ulmer & Berne LLP

(57) ABSTRACT

A toy vehicle includes a base, a body, and at least one of a front wheel assembly and a rear wheel assembly. The base includes a first curved member, a second curved member, and a cross member securing the first curved member to the second curved member. The first curved member includes a first front arm and a first rear arm and the second curved member has a second front arm and a second rear arm. The front wheel assembly includes a first front wheel assembly and a second front wheel assembly having respective first and second wheels. The front wheel assemblies mount to the respective first front arms. The front wheels are movable between among at least one of a first position and a second position. Methods of converting a toy vehicle are also provided herein.

19 Claims, 11 Drawing Sheets

TOY VEHICLE

TECHNICAL FIELD

Toy vehicles and methods for converting the same are provided.

BACKGROUND

Conventional toy vehicles allow a child to sit astride the toy vehicle and self-propel the toy vehicle with his or her feet. These conventional toy vehicles can have a single arrangement, including, a bicycle, a tricycle, and a quadacycle. A toy vehicle having the ability to easily be converted into multiple arrangements would provide numerous entertainment options and cost savings.

SUMMARY

In accordance with one embodiment, a toy vehicle comprises a base, a body, and at least one of a front wheel assembly and a rear wheel assembly. The base comprises a first curved member, a second curved member, and a cross member. The cross member secures the first curved member to the second curved member. The first curved member comprises a first front arm and a first rear arm and the second curved member comprises a second front arm and a second rear arm. The body is mounted to and supported by the base. The body comprises a front region and a rear region. The front wheel assembly comprises a first front wheel assembly and a second front wheel assembly. The first front wheel assembly mounts to the first front arm and the second front wheel assembly mounts to the second front arm. The first front wheel assembly comprises a first front wheel and the second front wheel assembly comprises a second front wheel. The rear wheel assembly comprises a first rear wheel assembly and a second rear wheel assembly. The first rear wheel assembly mounts to the first rear arm and the second rear wheel assembly mounts to the second rear arm. The first rear wheel assembly comprises a first rear wheel and the second rear wheel assembly comprises a second rear wheel. Each of the wheels are movable between among at least one of a first position and a second position, such that any of the wheels at the first position are outwardly mounted from the respective curved member and any of the wheels at the second position are inwardly mounted from the respective curved member.

In accordance with another embodiment, a method of converting a toy vehicle is provided. The method comprises providing a toy vehicle having a first wheel arrangement. The toy vehicle comprises a base, a body, at least one of a front wheel assembly and a first rear wheel assembly, and a locking mechanism. The base comprises a first curved member, a second curved member, and a cross member. The cross member secures the first curved member to the second curved member. The first curved member comprises a first front arm and a first rear arm and the second curved member comprises a second front arm and a second rear arm. The body is mounted to and supported by the base. The body comprises a front region and a rear region. The front wheel assembly comprises a first front wheel assembly and a second front wheel assembly. The first front wheel assembly mounts to the first front arm and the second front wheel assembly mounts to the second front arm. The first front wheel assembly comprises a first front wheel and the second front wheel assembly comprises a second front wheel. The rear wheel assembly comprises a first rear wheel assembly and a second rear wheel assembly. The first rear wheel assembly mounts to the first rear arm and the second rear wheel assembly mounts to the second rear arm. The first rear wheel assembly comprises a first rear wheel and the second rear wheel assembly comprises a second rear wheel. Each of the wheels are movable between among at least one of a first position and a second position, such that any of the wheels at the first position are outwardly mounted from the respective curved member and any of the wheels at the second position are inwardly mounted from the respective curved member. The locking mechanism is configured to lockably secure the wheels of each of the respective wheel assemblies at least one of the first location or the second location. Each locking mechanism comprises a released state and an engaged state. The wheels can move between among the at least one of the first position and the second position when the locking mechanism is in the released state. The wheels are locked at either the first position or the second position when the locking mechanism is in the engaged state. The method further comprises operating the locking mechanism of any of the wheel assemblies and rotating any of the front wheels and any of the rear wheels such that the toy vehicle converts from the first wheel arrangement to a second wheel arrangement.

In accordance with yet another embodiment, a toy vehicle comprises a base, a body, at least one of a front wheel assembly and a first rear wheel assembly, and a locking mechanism. The base comprises a first curved member, a second curved member, and a cross member. The cross member secures the first curved member to the second curved member. The first curved member comprises a first front arm and a first rear arm and the second curved member comprises a second front arm and a second rear arm. The body is mounted to and supported by the base. The body comprises a front region and a rear region. The front wheel assembly comprises a first front wheel assembly and a second front wheel assembly. The first front wheel assembly mounts to the first front arm and the second front wheel assembly mounts to the second front arm. The first front wheel assembly comprises a first front wheel and the second front wheel assembly comprises a second front wheel. The rear wheel assembly comprises a first rear wheel assembly and a second rear wheel assembly. The first rear wheel assembly mounts to the first rear arm and the second rear wheel assembly mounts to the second rear arm. The first rear wheel assembly comprises a first rear wheel and the second rear wheel assembly comprises a second rear wheel. Each of the wheels are movable between among at least one of a first position and a second position, such that any of the wheels at the first position are outwardly mounted from the respective curved member and any of the wheels at the second position are inwardly mounted from the respective curved member. The locking mechanism is configured to lockably secure the wheels of each of the respective wheel assemblies at least one of the first location or the second location. Each locking mechanism comprises a released state and an engaged state. The wheels can move between among the at least one of the first position and the second position when the locking mechanism is in the released state. The wheels are locked at either the first position or the second position when the locking mechanism is in the engaged state.

In accordance with another embodiment, a toy vehicle comprises a base, a body, a first front wheel assembly, a second front wheel assembly, a rear wheel assembly, and a locking mechanism. The base comprises a first curved member, a second curved member, and a cross member. The cross member secures the first curved member to the second curved member. The first curved member comprises a first front arm and a first rear arm and the second curved member comprises a second front arm and a second rear arm. The body is mounted to and supported by the base. The body comprises a front region and a rear region. The first front wheel assembly mounts to the first front arm and the second front wheel assembly mounts to the second front arm. The first front wheel assembly comprises a first front wheel and the second front wheel assembly comprises a second front wheel. The rear wheel assembly mounts to the first rear arm and to the second rear arm. The rear wheel assembly comprises a rear wheel. Each of the front wheels move between among at least one of a first position and a second position, such that any of the front wheels at the first position are outwardly mounted from the respective curved member and any of the front wheels at the second position are inwardly mounted from the respective curved member. The locking mechanism is associated with each of the front arms to lockably secure the respective front wheels at the at least one of the first location or the second location, wherein the locking mechanism comprises a released state and an engaged state, wherein the front wheels move between among the at least one of the first position and the second position when the locking mechanism is in the released state and the wheels are locked at either the first position or the second position when the locking mechanism is in the engaged state.

BRIEF DESCRIPTION OF DRAWINGS

It is believed that certain embodiments will be better understood from the following description taken in conjunction with the accompanying drawings in which.

DETAILED DESCRIPTION

Figure 1:
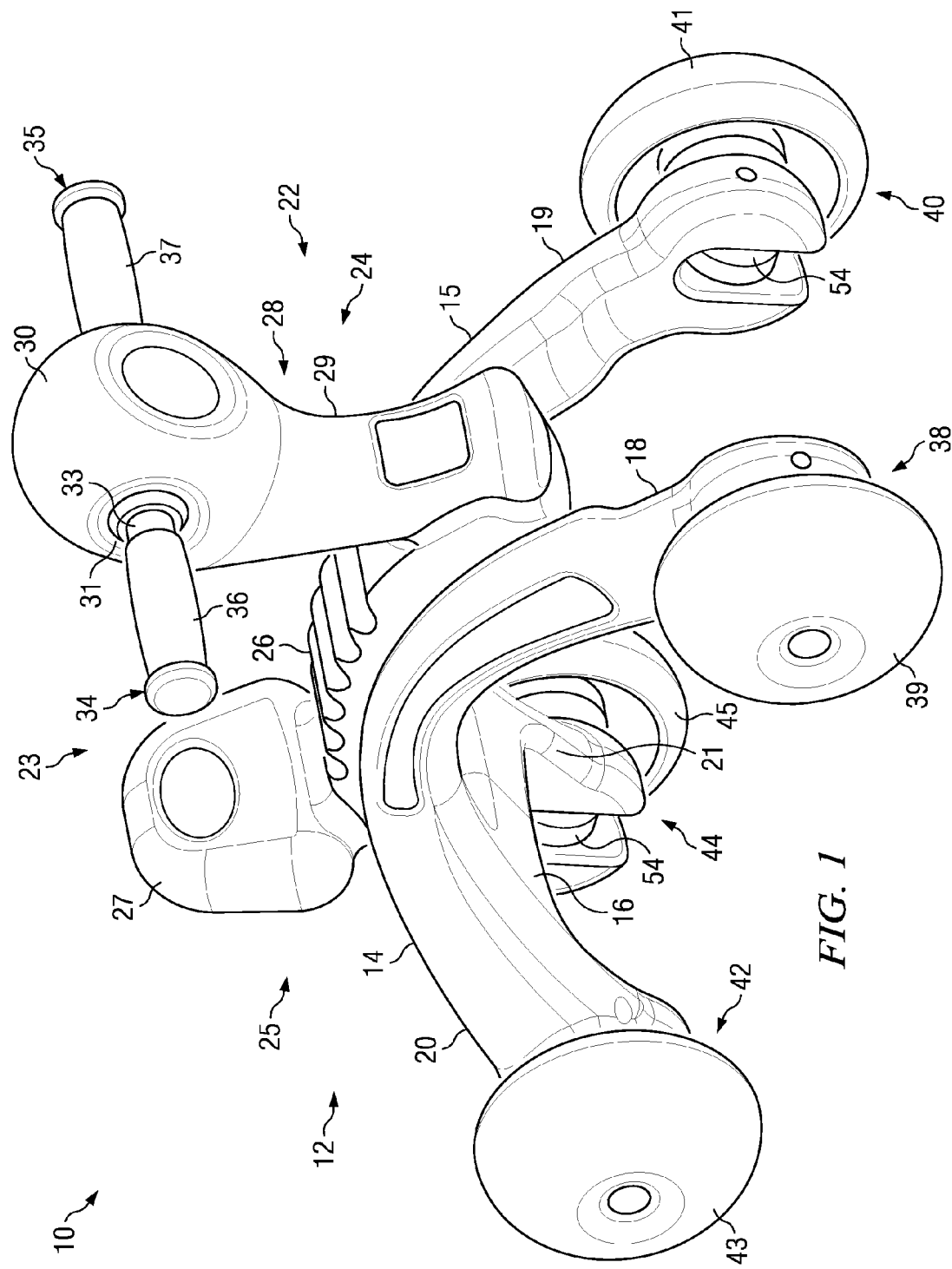
FIG. 1 is a perspective view depicting an embodiment of a toy vehicle with a quadacycle arrangement.
Figure 2:
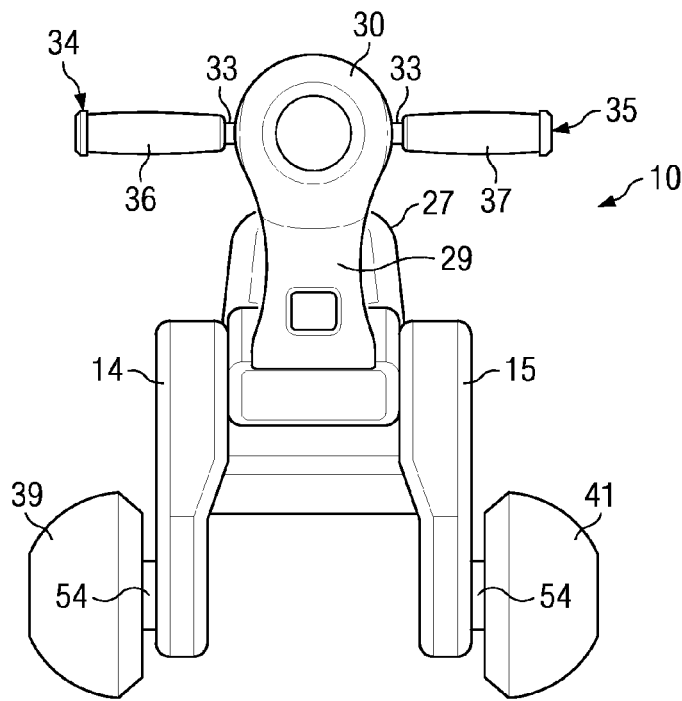
FIG. 2 is a front view depicting the toy vehicle of FIG. 1.
Figure 3:
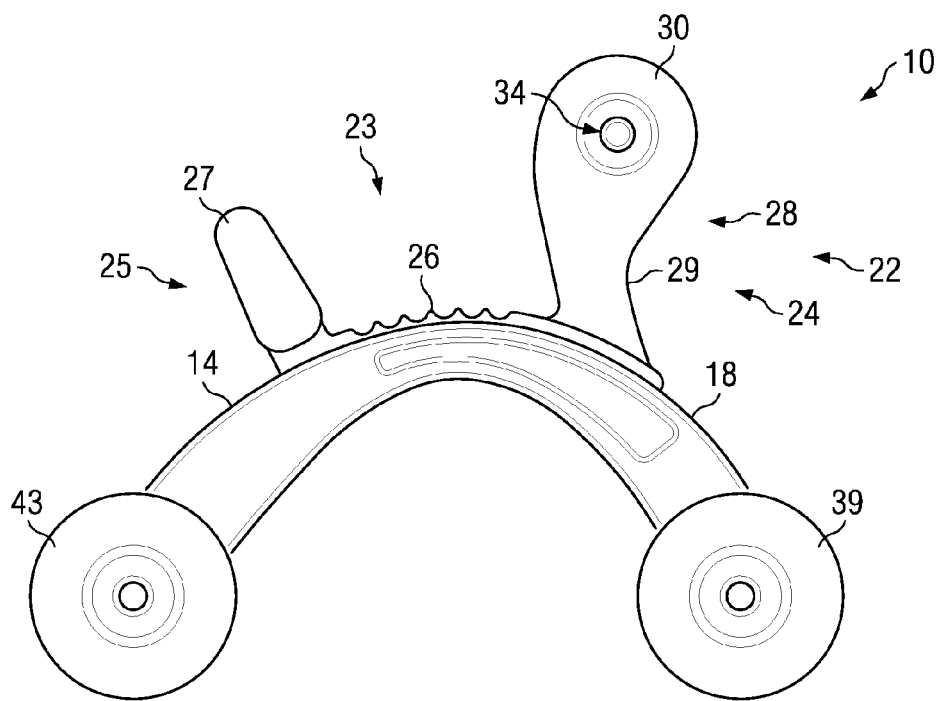
FIG. 3 is a side view depicting the toy vehicle of FIG. 1.
Figure 4:
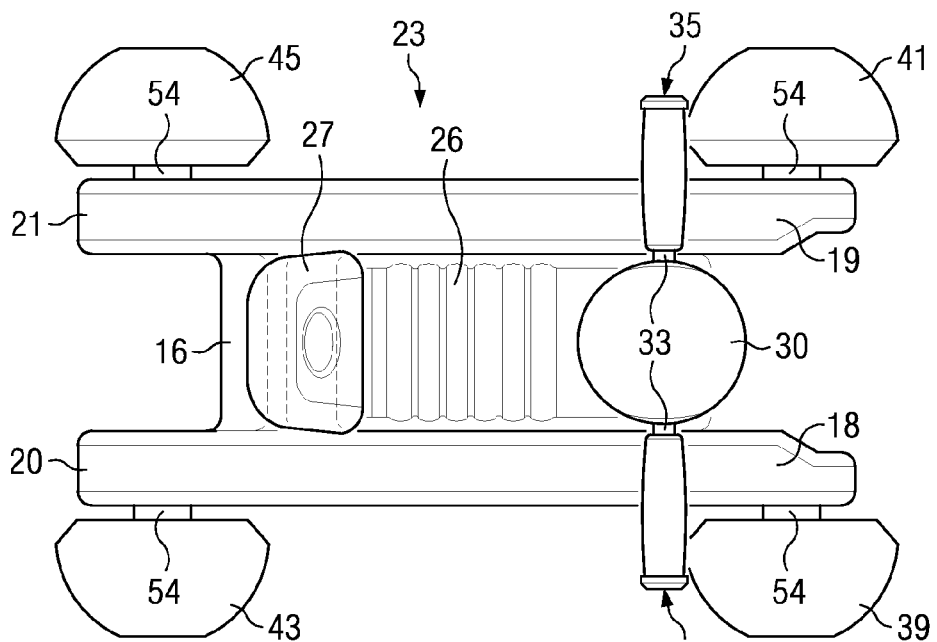
FIG. 4 is a top view depicting the toy vehicle of FIG. 1.
Figure 5:
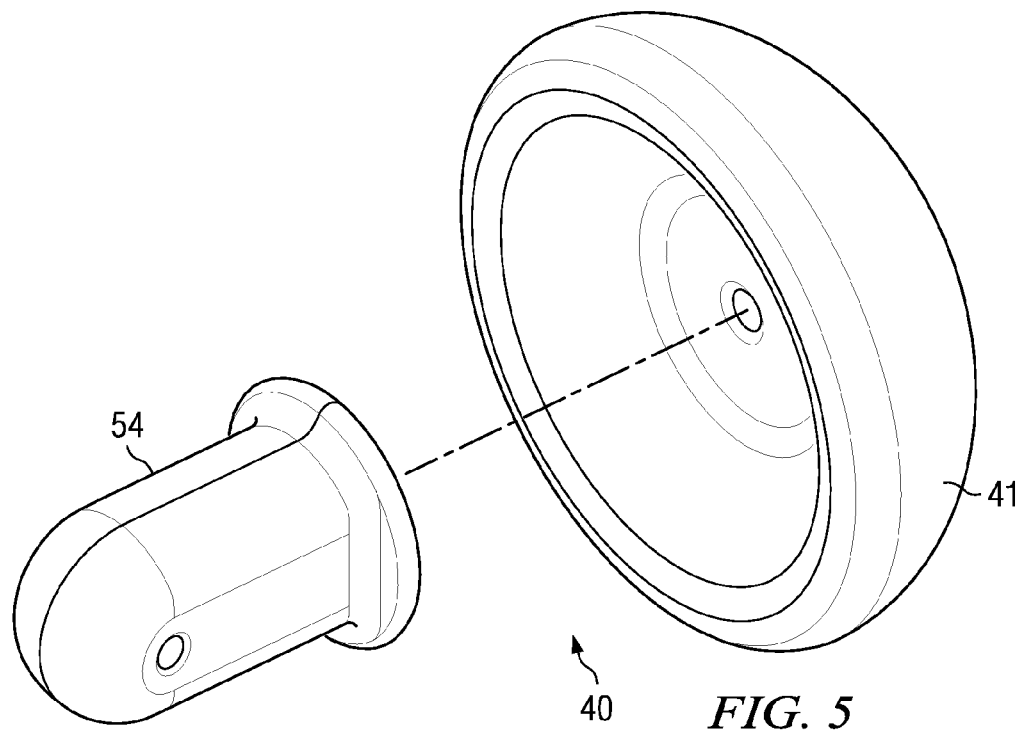
FIG. 5 is an exploded view depicting a wheel assembly, from the toy vehicle of FIG. 1.
Figure 6:
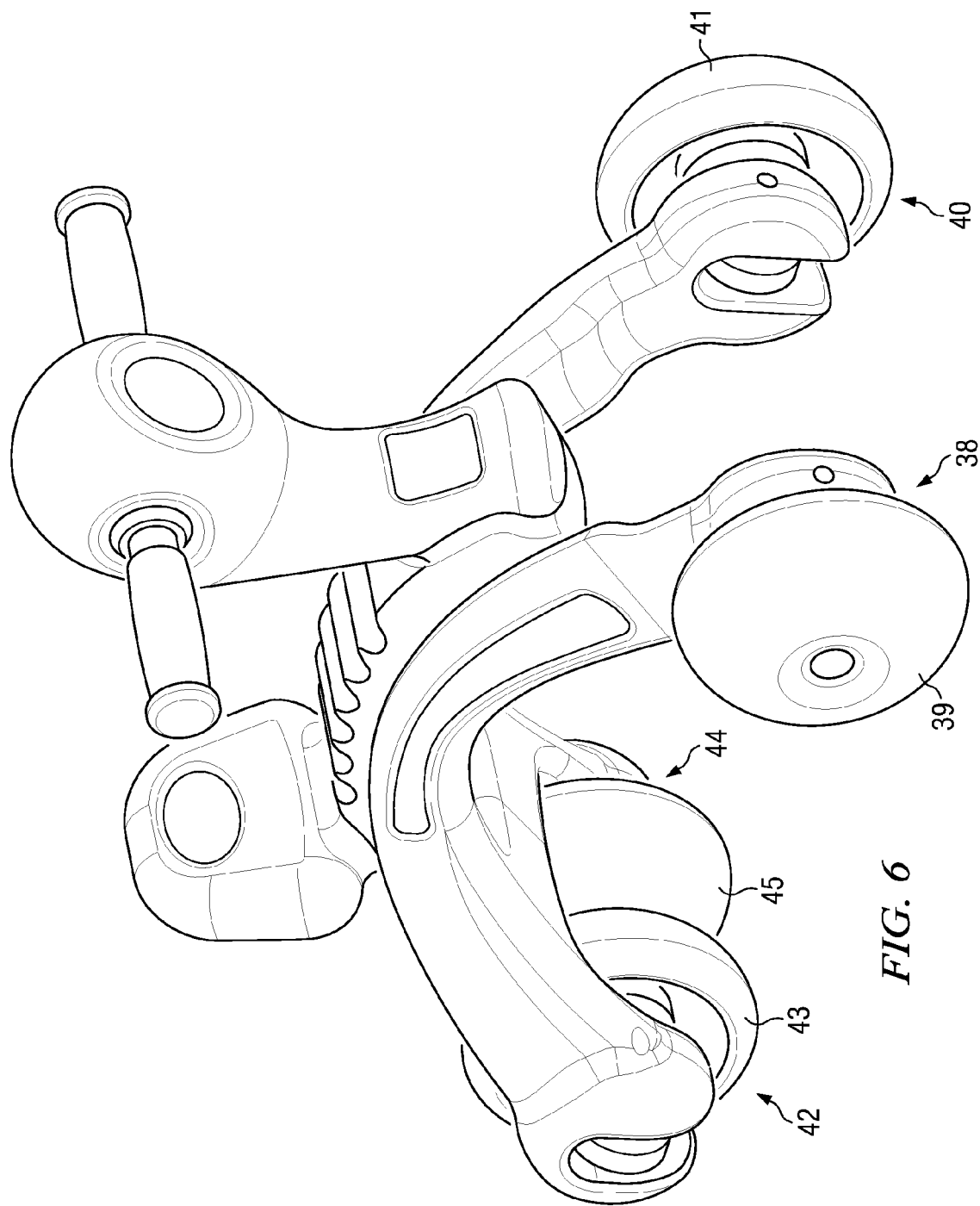
FIG. 6 is a perspective view depicting the toy vehicle shown in FIG. 1, wherein the toy vehicle has been converted to have a reverse tricycle arrangement.
Figure 7:
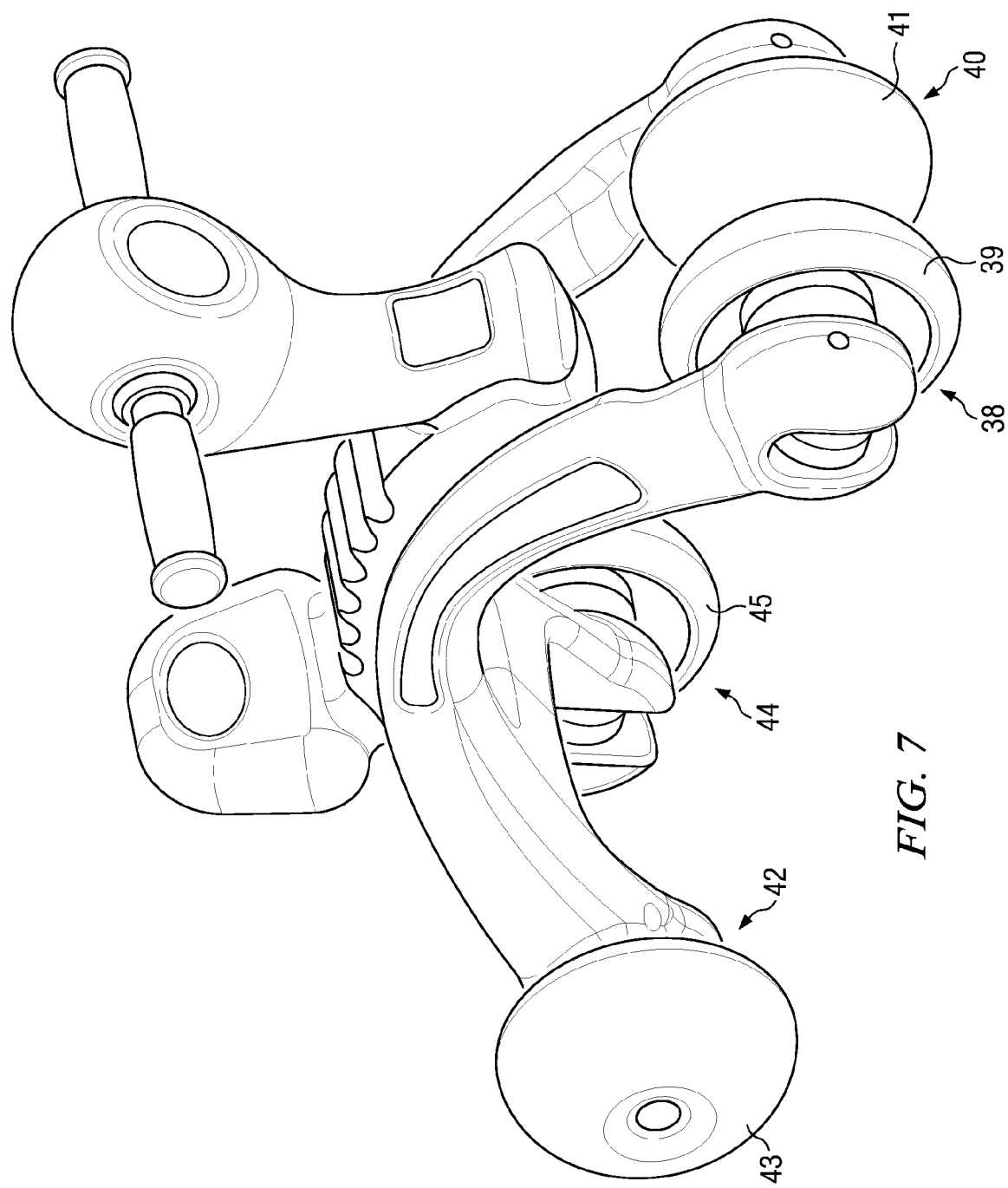
FIG. 7 is a perspective view depicting the toy vehicle shown in FIG. 1, wherein the toy vehicle has been converted to have a traditional tricycle arrangement.

Selected embodiments are hereinafter described in detail in connection with the views and examples of FIGS. 1-13, wherein like numbers (e.g., 10, 110, 210) indicate the same or corresponding elements throughout the views. As illustrated in FIGS. 1-4, a toy vehicle 10 can include a base 12, a body 22, at least one of a front wheel assembly and a rear wheel assembly, wherein the front wheel assembly includes a first front wheel assembly 38 and a second front wheel assembly 40, and the rear wheel assembly includes a first rear wheel assembly 42 and a second rear wheel assembly 44. The toy vehicle 10 can be formed partially or entirely of plastic. However, any of a variety of other materials (e.g., wood) can additionally or alternatively be provided to manufacture the toy vehicle. It will be appreciated that a toy vehicle can come in a variety of colors to add to the aesthetic appeal of the toy vehicle.

In accordance with one embodiment, with reference to FIGS. 1-4, the base 12 can include a first curved member 14, a second curved member 15, and a cross member 16. The cross member 16 can secure the first curved member 14 to the second curved member 15. The first curved member 14 can include a first front arm 18 and a first rear arm 20. The second curved member 15 can include a second front arm 19 and a second rear arm 21. While the embodiment shown in FIGS. 1-4 illustrates the first curved member 14, the second curved member 15, and the cross member 16 as being integrally formed with one another, it will be appreciated by one skilled in the art that a first curved member, a second curved member, and a cross member can each be independently formed and then attached to each other.

As illustrated in FIGS. 1-4, the body 22 can be configured to mount to and be supported by the base 12. It will be appreciated that various suitable methods can be utilized to provide sufficient connection between a body and a base, including, for example, use of fasteners, tabs, adhesives, and/or heat welds.

As further illustrated in FIGS. 1-4, the body 22 can include a front region 24 and a rear region 25. The front region 24 can include a substantially vertical member 28. The substantially vertical member 28, as shown in FIGS. 1-4, can include a neck portion 29 and a head portion 30. It will be appreciated that a neck portion and a head portion can be designed to take on various shapes and appearances. For instance, a neck portion and a head portion can be designed to look like a face of an animal or an imaginary creature. It will further be appreciated that decals, stickers, and other decorative items can be added to a neck portion and a head portion to aid in creating the appearance of an animal or an imaginary creature or to add aesthetic appeal to a toy vehicle. Moreover, as shown in FIGS. 1-4, the head portion 30 can define an opening 31. The opening 31 can be configured to receive a rod 33 having a first end 34 and a second end 35. It will be appreciated that a rod can aid a child in steering and propelling a toy vehicle. It will be appreciated that a first end and a second end of a rod can include hand grips (e.g., see items 36 and 37 in FIGS. 1-4) to aid a child in steering and propelling a toy vehicle. It will further be appreciated that a first and a second end of a rod can have decorative items, such as tassels, to add aesthetic appeal to a toy vehicle.

The rear region 25 can include a seat member 23 as illustrated in FIGS. 1-4. The seat member 23 can be designed to support a user, such as a young child, by having a seat 26 and a backrest 27. It will be appreciated that a seat can be designed to be of varying textures. For instance, as illustrated in FIGS. 1-4, the seat 26 can be designed to have a surface comprising grooves. It will be appreciated that grooves on a seat can assist a child in propelling a toy vehicle by preventing a child from sliding forward and/or backward on a seat while sitting astride a toy vehicle and self-propelling a toy vehicle with his or her feet. It will be appreciated that alternatively, a seat can have a smooth surface. The backrest 27 can allow a child to comfortably sit astride the toy vehicle and support them during use. As illustrated in FIGS. 1-4, the backrest 27 can define an opening to allow an individual to push or pull a toy vehicle. It will be appreciated that the ability to push or pull a toy vehicle can allow for an adult to push or pull a child sitting astride the toy vehicle for entertainment or traveling purposes. It will further be appreciated that the ability to push or pull a toy vehicle can allow an individual to easily place the toy vehicle into storage.

In accordance with one embodiment, with reference to FIGS. 1-4, each of the front wheel assemblies 38, 40 and each of the rear wheel assemblies 42, 44 can each include a prong (e.g., see item 54) and a wheel (e.g., see items 39, 41, 43, and 45). Such an arrangement can be more clearly seen in FIG. 5, which illustrates that the second front wheel assembly 40 can include a prong (e.g., see item 54) in association with the wheel 41. As shown in FIGS. 1-4, the first front wheel assembly 38 can include a first front wheel 39 and the second front wheel assembly 40 can include a second front wheel 41. The first rear wheel assembly 42 can include a first rear wheel 43 and the second rear wheel assembly 44 can include a second rear wheel 45. The first front wheel assembly 38 can mount to the first front arm 18 and the second front wheel assembly 40 can mount to the second front arm 19. The first rear wheel assembly 42 can mount to the first rear arm 20 and the second rear wheel assembly 44 can mount to the second rear arm 21. In one embodiment, a prong (e.g., see item 54) can rotatably mount the front wheels 39, 41 to each of the respective front arms 18, 19 and the prong can rotatably mount the rear wheels 43, 45 to each of the respective rear arms 20, 21. Each of the front arms 18, 19 and each of the rear arms 20, 21 can mount to a prong (e.g., see item 54) using a variety of methods, including, for example, fasteners, tabs, adhesives, compression fits, and any other suitable methods that one skilled in the art may contemplate.

Figure 8:
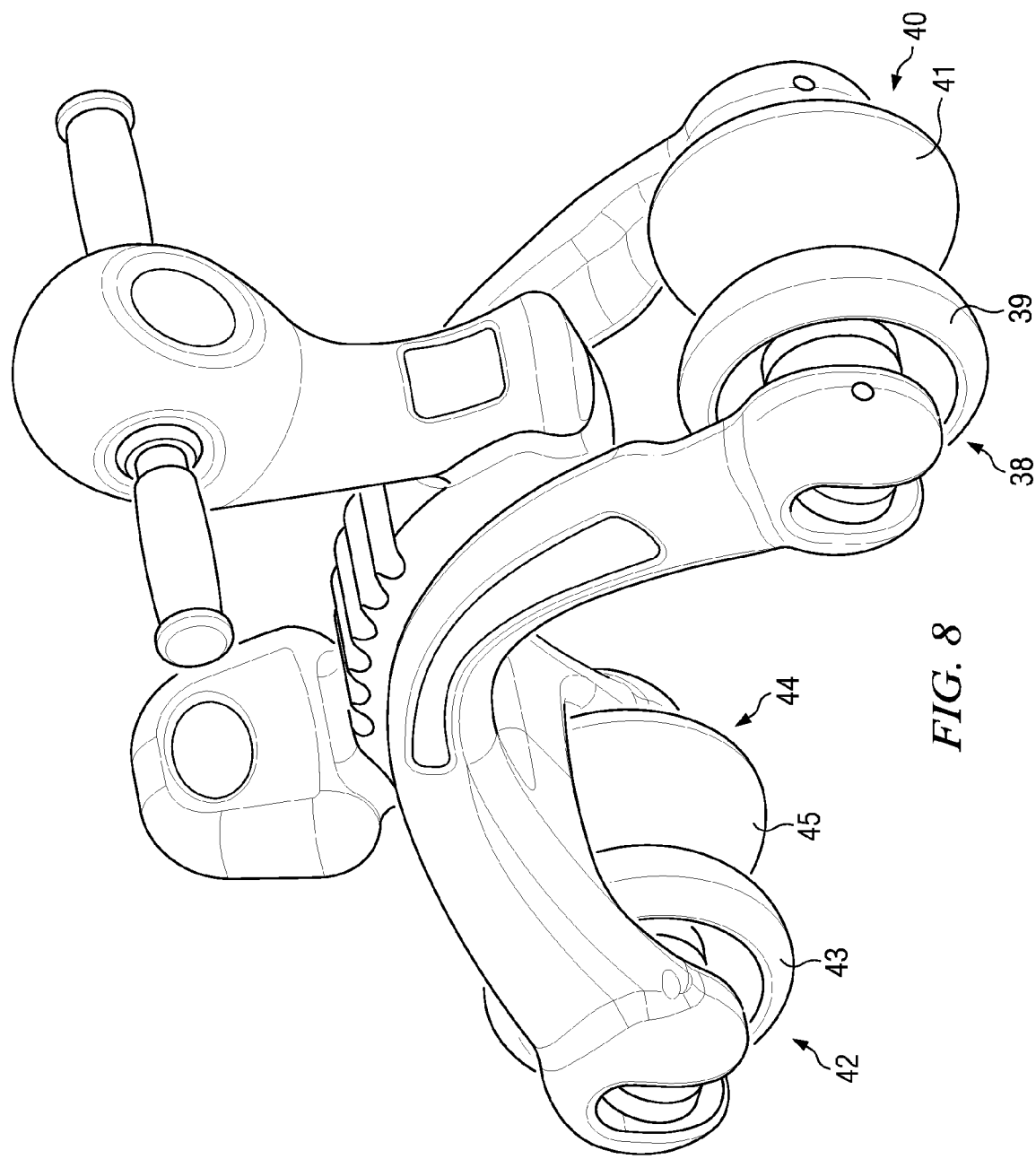
FIG. 8 is a perspective view depicting the toy vehicle shown in FIG. 1, wherein the toy vehicle has been converted to have a bicycle arrangement.

Each of the front wheels 39, 41 and each of the rear wheels 43, 45 can be movable between among at least one of a first position and a second position. As illustrated in FIG. 1, wheels (e.g., see items 39, 41, 43, 45) at the first position can be outwardly mounted from the respective curved members 14, 15. As illustrated in FIGS. 1-4, each of the wheels (e.g., see items 39, 41, 43, and 45) can be locked at the first position. As illustrated in FIG. 8, wheels (e.g., see items 39, 41, 43, 45) at the second position can be inwardly mounted from the respective curved members 14, 15. As shown in FIG. 8, each of the wheels (e.g., see items 39, 41, 43, and 45) is located at the second position. A prong (e.g., see item 54) can mount each of the respective wheel assemblies (e.g., see items 38, 40, 42, and 44) to each of the respective front arms 18, 19 and rear arms 20, 21 to allow the wheels (e.g., see items 39, 41, 43, and 45) to move between among at least one of the first position and the second position. It will be appreciated that the ability to rotate each wheel, independently of the other wheels, from a first position to a second position allows for a toy vehicle to be converted into various arrangements. For instance, in accordance with one embodiment, with reference to FIG. 1, the front wheels 39, 41 and the rear wheels 43, 45 can each be at the first position allowing the toy vehicle 10 to have a quadacycle arrangement. In accordance with another embodiment, with reference to FIG. 6, the front wheels 39, 41 can be at the first position and the rear wheels 43, 45 can be at the second position allowing the toy vehicle 10 to have a reverse tricycle arrangement. In accordance with yet another embodiment, with reference to FIG. 7, the front wheels 39, 41 can be at the second position and the rear wheels 43, 45 can be at the first position allowing the toy vehicle 10 to have a traditional tricycle arrangement. In accordance with still another embodiment, with reference to FIG. 8, the front wheels 39, 41 and the rear wheels 43, 45 can be at the second position allowing the toy vehicle 10 to have a bicycle arrangement. It will be appreciated that a toy vehicle can having various arrangements which allows a user to select from numerous entertainment options.

Figure 9:
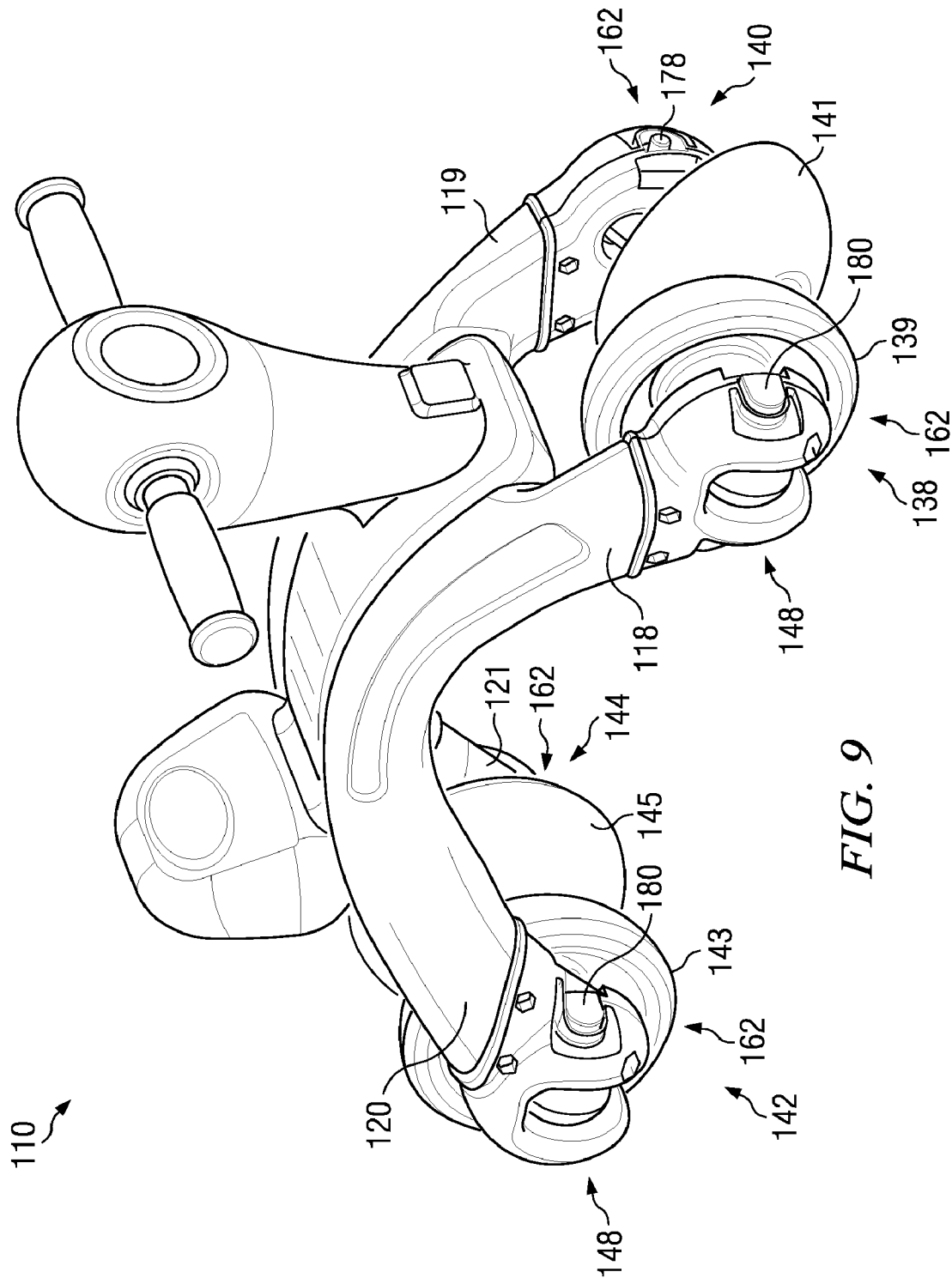
FIG. 9 is a perspective view depicting an embodiment of a toy vehicle, including wheels which are rotatable.
Figure 10:
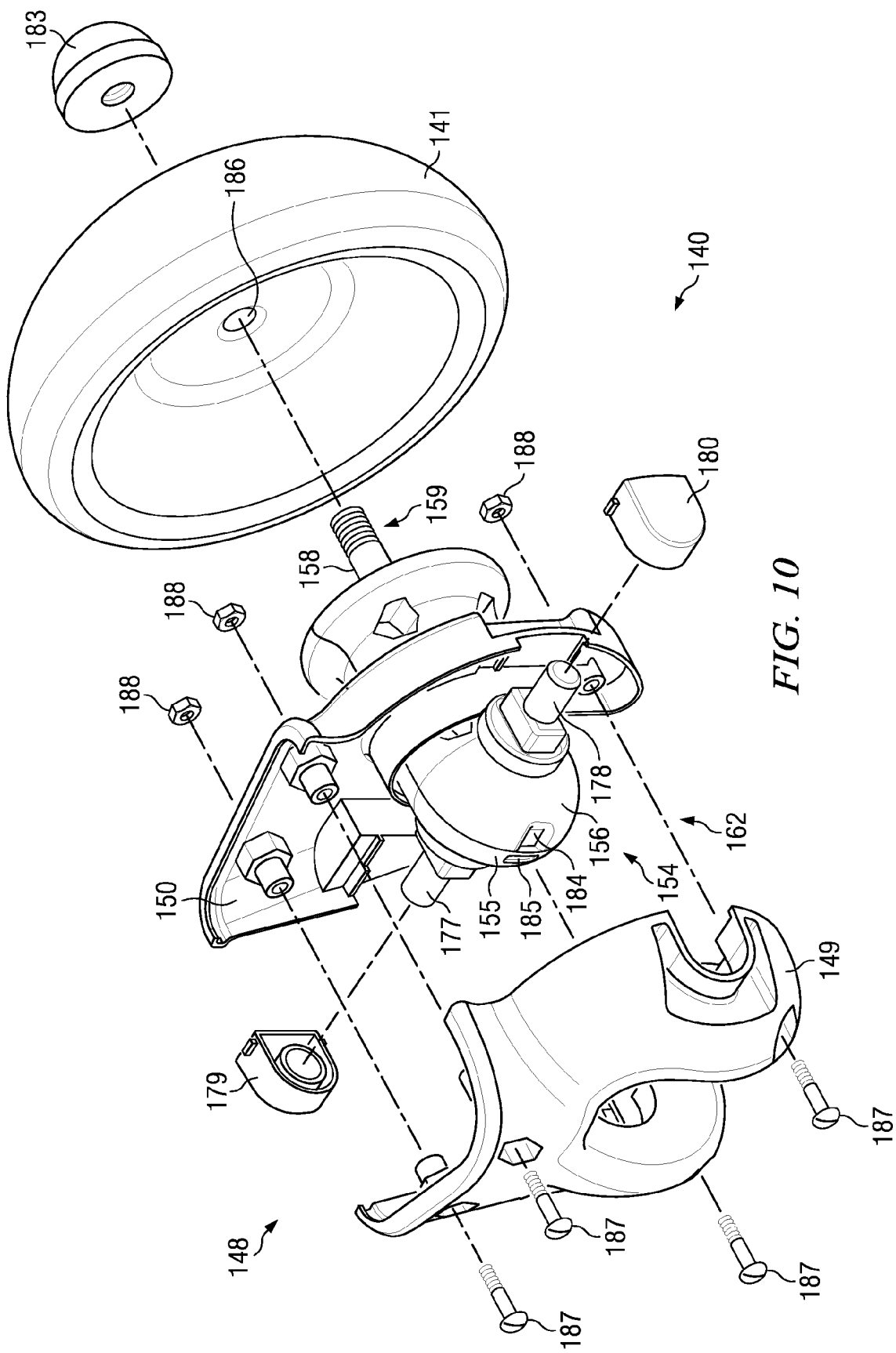
FIG. 10 is an exploded view depicting a wheel assembly from the toy vehicle of FIG. 9, which includes a locking mechanism.
Figure 11:
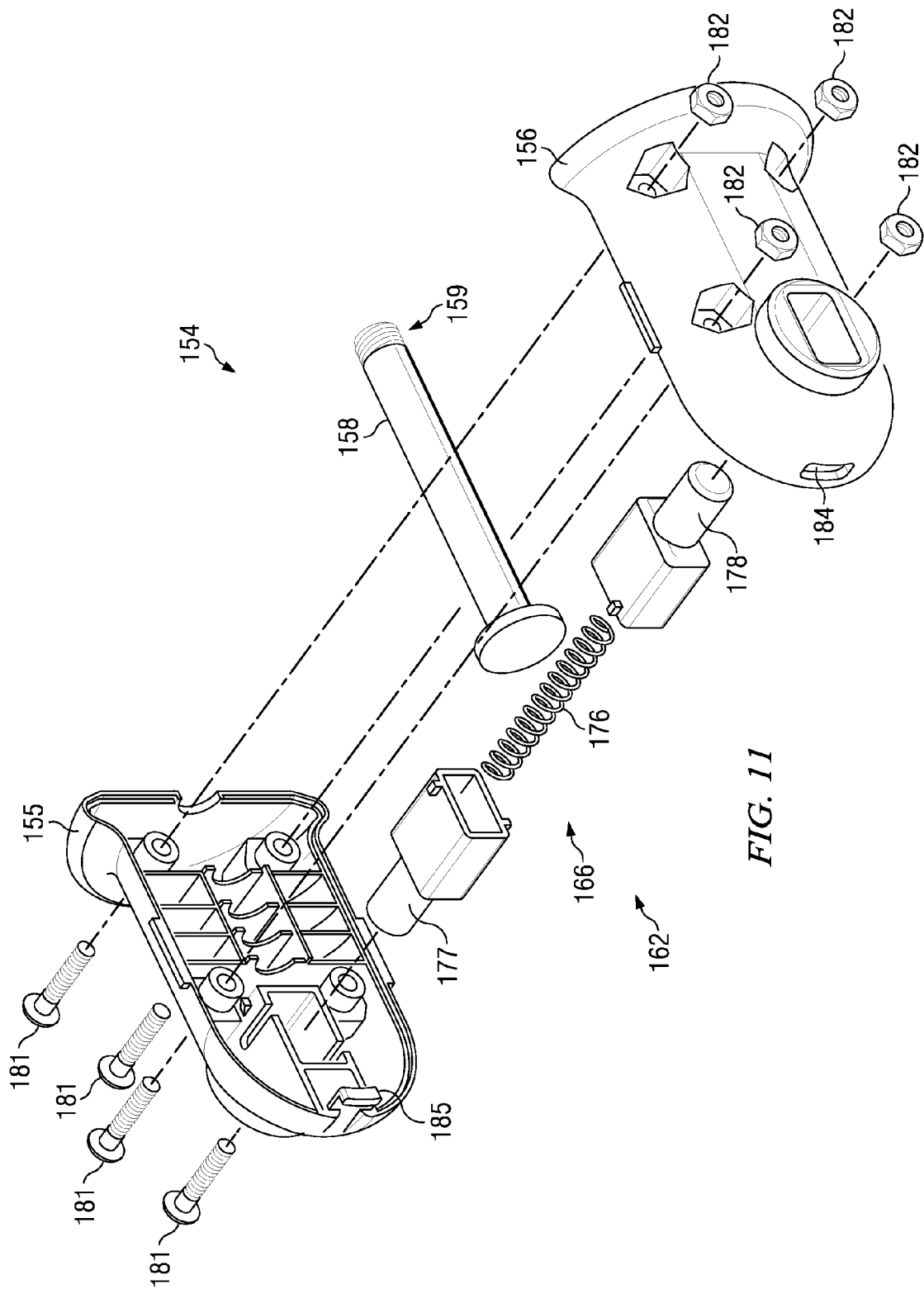
FIG. 11 is an exploded view of the locking mechanism shown in FIG. 10, depicting a compression spring arrangement.

In one embodiment, with reference to FIGS. 9-10, a toy vehicle 110 can include locking mechanisms (e.g., see item 162) associated with each respective front wheel assemblies 138, 140 and rear wheel assemblies 142, 144. A locking mechanism (e.g., see item 162) can lockably secure each respective wheel (e.g., see items 139, 141, 143, and 145) at the first position or the second position. As shown in FIGS. 10-11, a locking mechanism (e.g., see item 162) can include a compression spring arrangement 166 which can provide the locking mechanism (e.g., see item 162) with a released state and an engaged state. When a locking mechanism (e.g., see item 162) is in a released state, the respective wheel (e.g., see items 139, 141, 143, and 145) can rotate from the first position to the second position or the second position to the first position. When a locking mechanism (e.g., see item 162) is in an engaged state, the respective wheel (e.g., see items 139, 141, 143, and 145) can lock at either the first position and/or the second position.

In one embodiment, as shown in FIGS. 9-11, a compression spring arrangement 166 can include a compression spring 176 and buttons 177, 178 to actuate the compression spring 176. As illustrated in FIG. 10, covers 179, 180 can be placed over the buttons 177, 178. It will be appreciated that a cover can protect buttons from accidental compression by a user (e.g., a child). It will be further be appreciated that in an alternative embodiment, a cover can provide a user with a surface to make it easier to operate a locking mechanism and, therefore, rotate a wheel from a first position to a second position or a second position to a first position. It will further be appreciated that a cover will add an aesthetically pleasing look to a toy vehicle.

In accordance with one embodiment, as shown in FIGS. 10-11, a prong (e.g., see item 154) can include a pin 158. As shown in FIG. 11, a prong (e.g., see item 154) can be configured to receive the pin 158 and the compression spring arrangement 166. As illustrated in FIGS. 10-11, a prong (e.g., see item 154) can have a first portion 155 and a second portion 156 forming respective halves which can be configured to partially enclose the pin 158 and compression spring arrangement 166. In one embodiment, with reference to FIGS. 10-11, the first portion 155 of a prong (e.g., see item 154) can have a tab 185 and the second portion 156 of the prong can have a slot 184. The slot 184 can be configured to receive the tab 185 and secure the first portion 155 and the second portion 156 of a prong (e.g., see item 154) together. In one embodiment, as shown in FIG. 11, fasteners (e.g., nuts 181 and bolts 182) can be used to secure the pin 158 and the compression spring arrangement 166 in a prong (e.g., see item 154).

In one embodiment, with reference to FIG. 9, each of front arms 118, 119 and each of rear arms 120, 121 can include a receiving member (e.g., see item 148). Each respective receiving member (e.g., see item 148) can be configured to engage each respective prong (e.g., see item 154) to rotatably mount front wheels 139, 141 to each of the respective front arms 118, 119 and rotatably mount rear wheels 143, 145 to each of the respective rear arms 120, 121. In one embodiment, as shown in FIG. 10, a receiving member (e.g., see item 148) can have a first half 149 and a second half 150 each can be configured to engage each respective prong (e.g., see item 54). As illustrated in FIG. 10, fasteners (e.g., nuts 187 and bolts 188) can be used to secure each receiving member (e.g., see item 148).

The pin 158 can rotatably mount to each of the wheels (e.g., see items 139, 141, 143, and 145) for each of the respective wheel assemblies (e.g., see items 138, 140, 142, and 144). For instance, as illustrated in FIGS. 9-10, the wheel 141 can be mounted to the toy vehicle 110 where the pin 158, having a connection end 159, is placed through an aperture 186 defined by the wheel 141 and the pin 158 can attach to a threading cap 183 so that the wheel 141 can become rotatably mounted to the toy vehicle 110.

The toy vehicle 110 as illustrated in FIG. 9 can be converted into various wheeled arrangements, such as a bicycle arrangement, a reverse tricycle arrangement, a traditional tricycle arrangement, or a quadacycle arrangement. In order to convert the toy vehicle 110 from a first arrangement to a second arrangement, a user can operate a locking mechanism (e.g., see item 162) of any of the wheel assemblies (e.g., see items 138, 140, 142, and 144). For instance, in one embodiment, a user can remove the covers 179, 180 covering the buttons 177, 178 and can actuate the compression spring 176 by pressing the buttons 177, 178 inward. By actuating the buttons 177, 178, the user can release a locking mechanism (e.g., see item 162) from an engaged state. When a locking mechanism (e.g., see item 162) is in the released state, a user can then rotate the released wheel (e.g., see items 139, 141, 143, and 145) from either a first position or a second position to the other position. For example, as illustrated in FIG. 9, when a locking mechanism (e.g., see item 162) is in an engaged state the wheel 141 can be prevented from rotating and once the locking mechanism is release, the user can rotate the released wheel (e.g., see items 139, 141, 143, and 145) from either the first position to the second position or from the second position to the first position. The user can then re-engage a locking mechanism (e.g., see item 162) of any of the wheel assemblies (e.g., see items 138, 140, 142, and 144) locking the respective wheel (e.g., see items 139, 141, 143, and 145) in either the first position or the second position. In rotating the wheels (e.g., see items 139, 141, 143, and 145), to either the first position or the second position, the user can convert the toy vehicle 110 from a first wheel arrangement to a second wheel arrangement, such that the second wheel arrangement can differ from the first wheel arrangement.

Figure 12:
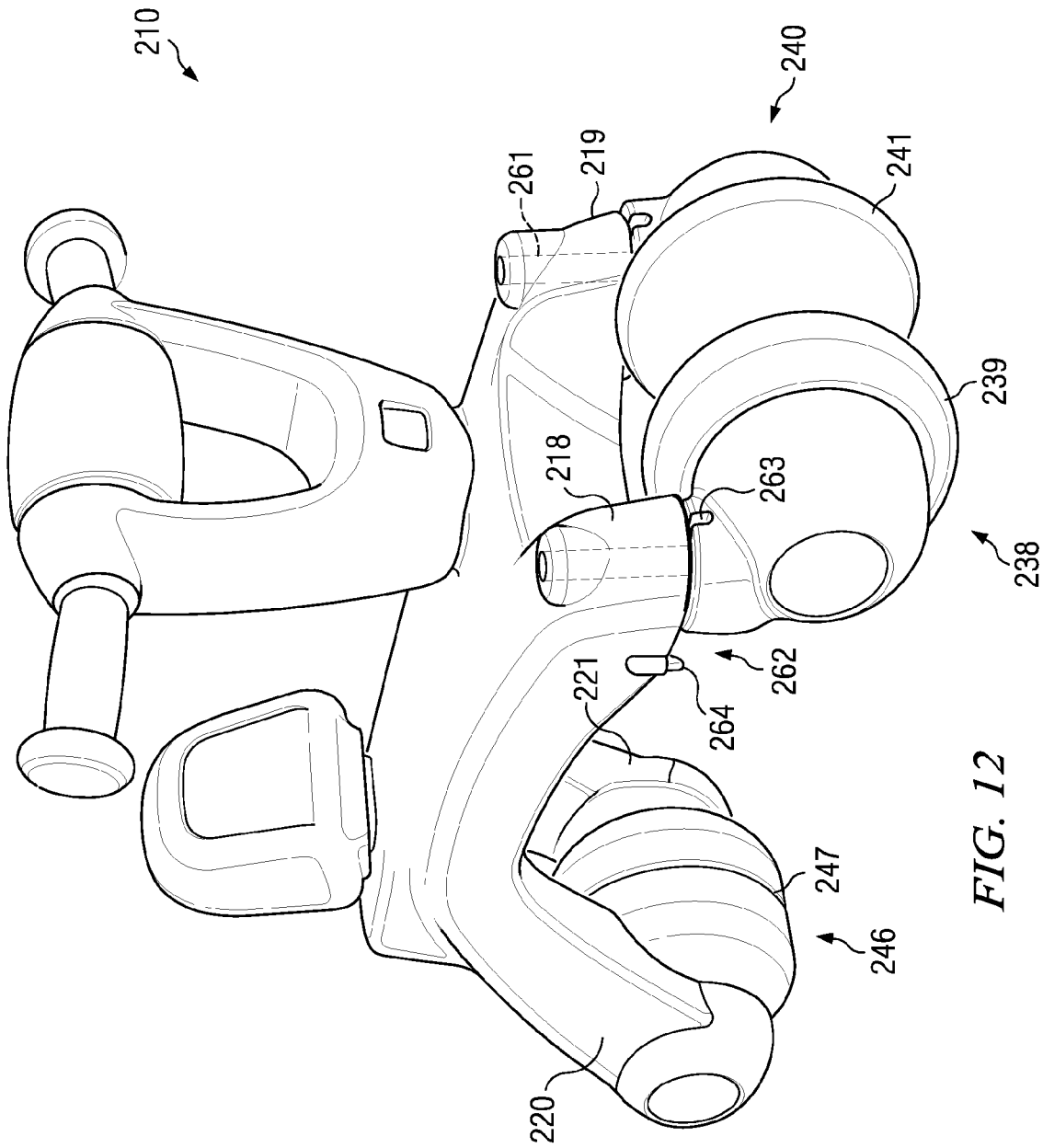
FIG. 12 is a perspective view depicting an embodiment of a toy vehicle, including front wheels which are rotatable, wherein certain hidden objects of the toy vehicle are represented by dashed lines.
Figure 13:
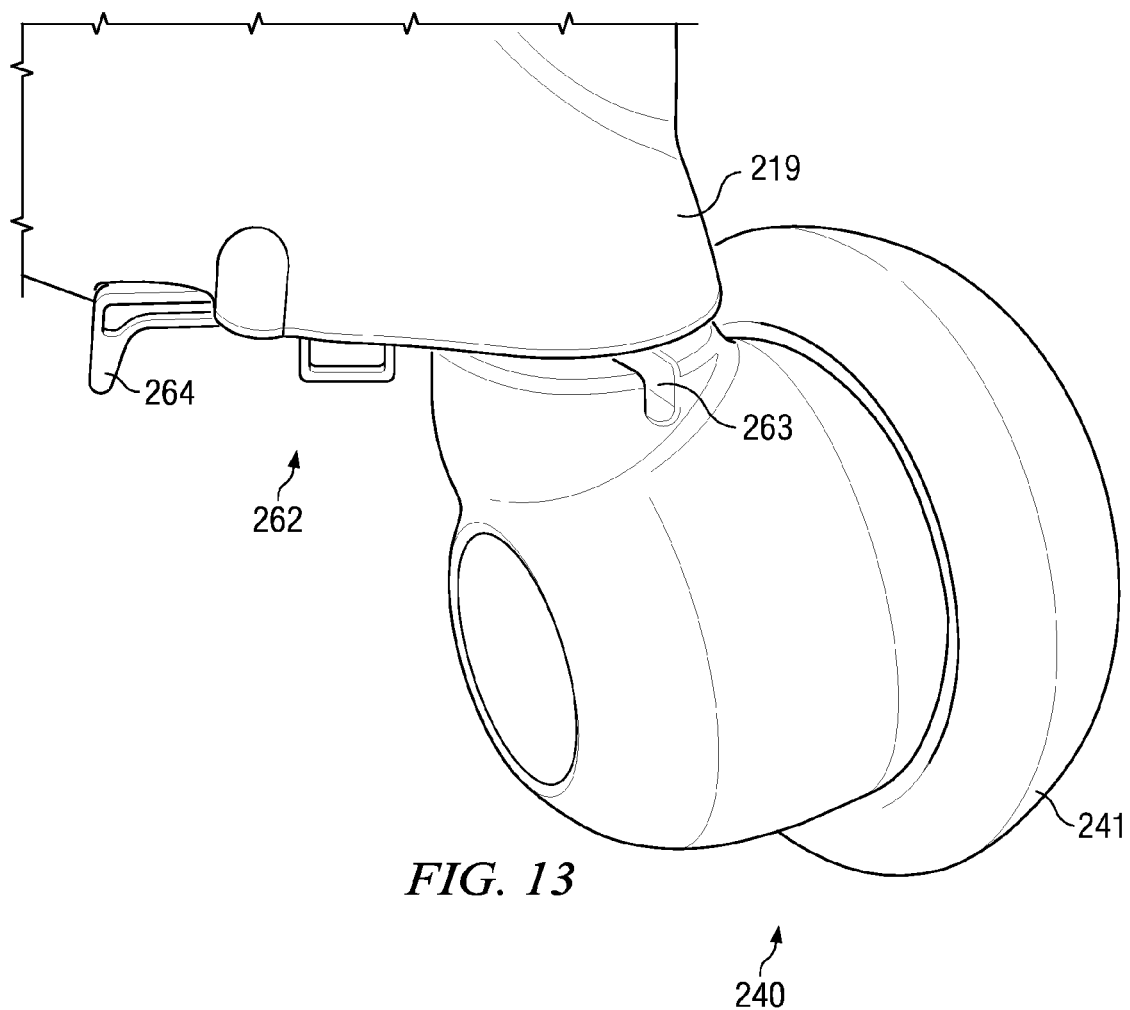
FIG. 13 is a perspective view depicting the toy vehicle in FIG. 12, wherein one front wheel is shown in partial rotation.

In an alternative embodiment, with reference to FIGS. 12-13, a toy vehicle 210 can be configured to convert into various arrangements using an alternative locking mechanism (e.g., see item 262). This toy vehicle 210 can have a first front wheel assembly 238, a second front wheel assembly 240, and a rear wheel assembly 246. The first front wheel assembly 238 can include a first front wheel 239 and the second front wheel assembly 240 can include a second front wheel 241. The rear wheel assembly 246 can include a rear wheel 247. The first front wheel assembly 238 can mount to a first front arm 218 and the second front wheel assembly 240 can mount to a second front arm 219. The rear wheel assembly 246 can mount to a first rear arm 220 and to a second rear arm 221. In one embodiment, a rod (e.g., see item 261 shown in dashed for clarity) can rotatably mount the front wheel assemblies 239, 241 to each of the respective front arms 218, 219. For example, the rod (e.g., see item 261) can pass from the front arm 218 through the front wheel assembly 238. Thus, the rod (e.g., see item 261) can allow each of the front wheels 239, 241 to be movable between among at least one of a first position and a second position.

In accordance with one embodiment, as shown in FIGS. 12-13, the toy vehicle 210 can include a locking mechanism (e.g., see item 262) associated with the front arms 218, 219 and front wheel assemblies 239, 240. A locking mechanism (e.g., see item 262) can lockably secure each respective front wheel 239, 241 at the first position and/or the second position. As shown in FIGS. 12-13, a locking mechanism (e.g., see item 262) can include a slot 263 and a lever 264 which can be utilized together to allow the locking mechanism to have a released state and an engaged state. When a locking mechanism (e.g., see item 262) is in a released state, the respective front wheel 239, 241 can rotate from the first position to the second position or the second position to the first position. When a locking mechanism (e.g., see item 262) is in an engaged state, the respective front wheel 239, 241 can lock at either the first position and/or the second position.

The toy vehicle 210 as illustrated in FIG. 12 can be converted into a bicycle arrangement or a reverse tricycle arrangement. In order to convert the toy vehicle 210 from a first arrangement to a second arrangement, a user can operate a locking mechanism (e.g., see item 262). For instance, in one embodiment, a user can disengage the lever 264 so that the lever 264 no longer contacts the slot 264, thus placing a locking mechanism (e.g., see item 262) in a released state. A lever can be designed to be actuated in a variety of ways, including, for example, using a compression spring arrangement and any other suitable methods that one skilled in the art may contemplate. When a locking mechanism (e.g., see item 262) is in the released state, a user can then rotate the released front wheel (e.g., see items 239, 241) from either a first position or a second position to the other position. For example, as illustrated in FIG. 13, when a locking mechanism (e.g., see item 262) is in an engaged state the front wheel 241 can be prevented from rotating and once the locking mechanism is a released state, the user can rotate the released front wheel 241 from either the first position to the second position or from the second position to the first position. The user can then re-engage a locking mechanism (e.g., see item 262) so that the lever 264 reengages the slot 263, thus locking the respective front wheel 239, 241 in either the first position and/or the second position. In rotating the front wheels 239, 241 to either the first position and/or the second position, the user can convert the toy vehicle 210 from a first wheel arrangement to a second wheel arrangement, such that the second wheel arrangement can differ from the first wheel arrangement.

The multiple configurations of a toy vehicle can enhance the utility and aesthetic appeal of the toy vehicle and provide numerous advantages over conventional toy vehicles.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed:

1. A toy vehicle comprising:
   a base comprising a first curved member, a second curved member, and a cross member, wherein the cross member secures the first curved member to the second curved member, wherein the first curved member comprises a first front arm and a first rear arm and the second curved member comprises a second front arm and a second rear arm;
a body mounted to and supported by the base, the body comprising a front region and a rear region; and
at least one of a front wheel assembly and a rear wheel assembly, wherein the front wheel assembly comprises a first front wheel assembly and a second front wheel assembly, wherein the first front wheel assembly mounts to the first front arm and the second front wheel assembly mounts to the second front arm, wherein the first front wheel assembly comprises a first front wheel and the second front wheel assembly comprises a second front wheel, wherein the rear wheel assembly comprises a first rear wheel assembly and a second rear wheel assembly, wherein the first rear wheel assembly mounts to the first rear arm and the second rear wheel assembly mounts to the second rear arm, wherein the first rear wheel assembly comprises a first rear wheel and the second rear wheel assembly comprises a second rear wheel, wherein each of the wheels is movable between among at least one of a first position and a second position, such that any of the wheels at the first position are outwardly mounted from the respective curved member and any of the wheels at the second position are inwardly mounted from the respective curved member.

2. The toy vehicle of claim 1, wherein the front region comprises a substantially vertical member defining an opening, wherein the opening is configured to receive a rod having a first end and a second end.

3. The toy vehicle of claim 1, wherein the rear region comprises a seat member.

4. The toy vehicle of claim 1, wherein the toy vehicle comprises a bicycle arrangement when each of the front wheels and the rear wheels are at the first position.

5. The toy vehicle of claim 1, wherein the toy vehicle comprises a quadacycle arrangement when each of the front wheels and the rear wheels are at the second position.

6. The toy vehicle of claim 1, wherein the toy vehicle comprises a traditional tricycle arrangement when each of the front wheels are at the first position and each of the rear wheels are at the second position.

7. The toy vehicle of claim 1, wherein the toy vehicle comprises a reverse tricycle arrangement when each of the front wheels are at the second position and each of the rear wheels are at the first position.

8. The toy vehicle of claim 1, wherein each of the front wheel assemblies and each of the rear wheel assemblies comprises a prong, wherein each respective prong rotatably mounts each of the front wheels to each of the respective front arms and each respective prong rotatably mounts each of the rear wheels to each of the respective rear arms.

9. The vehicle of claim 8, wherein each of the prongs is mounted to each of the respective wheel assemblies to allow the wheels to move between among the at least one of the first position and the second position.

10. The toy vehicle of claim 8, wherein each of the front arms and each of the rear arms comprises a receiving member, wherein each of the respective receiving members is configured to engage each of the respective prongs to rotatably mount the front wheels to each of the respective front arms and rotatably mount the rear wheels to each of the respective rear arms.

11. The toy vehicle of claim 10, wherein each of the prongs further comprises a pin, wherein each of the pins rotatably mounts to each of the respective wheels for each of the respective wheel assemblies.

12. The toy vehicle of claim 1, wherein each of the wheel assemblies further comprises a locking mechanism to lockably secure the respective wheels at the at least one of the first location or the second location, wherein the locking mechanism comprises a released state and an engaged state, wherein the wheels move between among the at least one of from the first position and the second position when the locking mechanism is in the released state and the wheels are locked at either the first position or the second position when the locking mechanism is in the engaged state.

13. The toy vehicle of claim 12, wherein the locking mechanism comprises a compression spring arrangement.

14. A method of converting a toy vehicle, the method comprising:
providing a toy vehicle having a first wheel arrangement, the toy vehicle comprising:
a base comprising a first curved member, a second curved member, and a cross member, wherein the cross member secures the first curved member to the second curved member, wherein the first curved member comprises a first front arm and a first rear arm and the second curved member comprises a second front arm and a second rear arm;
a body mounted to and supported by the base, the body comprising a front region and a rear region;
at least one of a front wheel assembly and a rear wheel assembly, wherein the front wheel assembly comprises a first front wheel assembly and a second front wheel assembly, wherein the first front wheel assembly mounts to the first front arm and the second front wheel assembly mounts to the second front arm, wherein the first front wheel assembly comprises a first front wheel and the second front wheel assembly comprises a second front wheel, wherein the rear wheel assembly comprises a first rear wheel assembly and a second rear wheel assembly, wherein the first rear wheel assembly mounts to the first rear arm and the second rear wheel assembly mounts to the second rear arm, wherein the first rear wheel assembly comprises a first rear wheel and the second rear wheel assembly comprises a second rear wheel, wherein each of the wheels is movable between among at least one of a first position and a second position, such that any of the wheels at the first position are outwardly mounted from the respective curved member and any of the wheels at the second position are inwardly mounted from the respective curved member; and
a locking mechanism configured to lockably secure the wheels of each of the respective wheel assemblies at the at least one of the first location or the second location, wherein the locking mechanism comprises a released state and an engaged state, wherein the wheels move between among the at least one of the first position and the second position when the locking mechanism is in the released state and the wheels are locked at either the first position or the second position when the locking mechanism is in the engaged state;
operating the locking mechanism of any of the wheel assemblies; and
rotating any of the front wheels and any of the rear wheels such that the toy vehicle converts from the first wheel arrangement to a second wheel arrangement.

15. The method of claim 14, wherein each of the front arms and each of the rear arms comprises a receiving member and each of the front wheel assemblies and each of the rear wheel assemblies comprises a prong, wherein each of the respective receiving members is configured to engage each of the respective prongs to rotatably mount the front wheels to each of the respective front arms and rotatably mount the rear wheels to each of the respective rear arms, wherein each of the prongs further comprises a pin, wherein each of the pins rotatably mounts to each of the respective wheels for each of the respective wheel assemblies.

16. The method of claim 14, wherein the locking mechanism comprises a compression spring arrangement.

17. The method of claim 14, wherein the first wheel arrangement comprises a bicycle arrangement, a traditional tricycle arrangement, a reverse tricycle arrangement, or a quadacycle arrangement.

18. The method of claim 14, wherein the second wheel arrangement comprises a bicycle arrangement, a traditional tricycle arrangement, a reverse tricycle arrangement, or a quadacycle arrangement, wherein the second wheel arrangement is different from the first wheel arrangement.

19. A toy vehicle comprising:
   a base comprising a first curved member, a second curved member, and a cross member, wherein the cross member secures the first curved member to the second curved member, wherein the first curved member comprises a first front arm and a first rear arm and the second curved member comprises a second front arm and a second rear arm;
   a body mounted to and supported by the base, the body comprising a front region and a rear region;
   at least one of a front wheel assembly and a rear wheel assembly, wherein the front wheel assembly comprises a first front wheel assembly and a second front wheel assembly, wherein the first front wheel assembly mounts to the first front arm and the second front wheel assembly mounts to the second front arm, wherein the first front wheel assembly comprises a first front wheel and the second front wheel assembly comprises a second front wheel, wherein the rear wheel assembly comprises a first rear wheel assembly and a second rear wheel assembly, wherein the first rear wheel assembly mounts to the first rear arm and the second rear wheel assembly mounts to the second rear arm, wherein the first rear wheel assembly comprises a first rear wheel and the second rear wheel assembly comprises a second rear wheel, wherein each of the wheels is movable between among at least one of a first position and a second position, such that any of the wheels at the first position are outwardly mounted from the respective curved member and any of the wheels at the second position are inwardly mounted from the respective curved member; and
   a locking mechanism configured to lockably secure the wheels of each of the respective wheel assemblies at the at least one of the first location or the second location, wherein the locking mechanism comprises a released state and an engaged state, wherein the wheels move between among the at least one of the first position and the second position when the locking mechanism is in the released state and the wheels are locked at either the first position or the second position when the locking mechanism is in the engaged state.

* * * * *